(12) United States Patent
Kurokawa et al.

(10) Patent No.: US 6,943,521 B2
(45) Date of Patent: Sep. 13, 2005

(54) MOTOR DRIVE, MOTOR DRIVE CONTROL METHOD, AND COMPONENT ATTACHING DEVICE

(75) Inventors: Takahiro Kurokawa, Kofu (JP); Yoichi Tanaka, Yamanashi (JP); Seiichi Matsuo, Kofu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/381,214

(22) PCT Filed: Oct. 11, 2001

(86) PCT No.: PCT/JP01/08957

§ 371 (c)(1), (2), (4) Date: Mar. 28, 2003

(87) PCT Pub. No.: WO02/31959

PCT Pub. Date: Apr. 18, 2002

(65) Prior Publication Data

US 2003/0184250 A1 Oct. 2, 2003

(30) Foreign Application Priority Data

Oct. 11, 2000 (JP) .................................... 2000-310264

(51) Int. Cl.[7] ............................................ G05B 11/32
(52) U.S. Cl. ........................ 318/625; 318/34; 318/49; 318/569; 318/600
(58) Field of Search ...................... 318/625, 34, 49, 318/113, 569, 600

(56) References Cited

U.S. PATENT DOCUMENTS

| | | | | |
|---|---|---|---|---|
| 4,289,997 A | * | 9/1981 | Jung et al. | 318/113 |
| 5,619,111 A | * | 4/1997 | Katagiri et al. | 318/625 |
| 5,773,951 A | * | 6/1998 | Markowski et al. | 318/625 |
| 5,990,638 A | * | 11/1999 | Aoyama et al. | 318/85 |
| 6,057,664 A | | 5/2000 | Ikawa et al. | |
| 6,091,219 A | * | 7/2000 | Maruo et al. | 318/562 |
| 6,188,190 B1 | * | 2/2001 | Arakawa | 318/560 |
| 6,211,640 B1 | | 4/2001 | Fujisaki et al. | |
| 6,297,612 B1 | * | 10/2001 | Shloush et al. | 318/569 |
| 6,653,810 B2 | * | 11/2003 | Lo | 318/569 |

FOREIGN PATENT DOCUMENTS

| | | |
|---|---|---|
| DE | 19832819 | 10/1999 |
| JP | 63264769 | 11/1988 |
| JP | 58133066 | 8/1993 |
| JP | 11299291 | 10/1999 |
| JP | 2000-139091 | 5/2000 |

OTHER PUBLICATIONS

English Language Abstract of JP Appln. No. 63–264769.
English Language Abstract of JP Appln. No. 58–133066.
English Language Abstract of JP Appln. No. 11–299291.
English Language Abstract of JP 2000–139091.

* cited by examiner

Primary Examiner—Rina Duda
(74) Attorney, Agent, or Firm—Greenblum & Bernstein, P.L.C.

(57) ABSTRACT

In a motor drive device having a plurality of driver units for driving motors and a command generator for giving a command to the driver units which are connected in serial communication, there is a communication section for setting up the communication formats corresponding to each of the driver units having different communication formats including data transmission speed from one another. Communication among the plurality of driver units with the respective communication formats and the command generator is carried out on a single serial bus.

11 Claims, 11 Drawing Sheets

Fig. 5

| Axial number | Data format | Data transmission speed | Occupation time | Communication data Master → Slave | Error code |
|---|---|---|---|---|---|

Fig. 6

| Axial number | Data format | Data transmission speed | Occupation time | Communication data Slave → Master | Error code |
|---|---|---|---|---|---|

MOTOR DRIVE, MOTOR DRIVE CONTROL METHOD, AND COMPONENT ATTACHING DEVICE

TECHNICAL FIELD

The present invention relates to a component mounting apparatus for mounting an electronic component on a substrate, a motor drive device for driving a motor such as a servo motor used in the component mounting apparatus, and a motor drive control method.

BACKGROUND ART

A motor drive device used in a conventional electronic component mounting apparatus, as shown in FIG. 12, consists of an NC unit 21 for command generation (hereinafter called a master), servo driver units 22, 28, and 29 (hereinafter called slaves), and cables 30 and 31 for connecting the master and slaves to carry out serial communication. The master 21 is provided with a master side communication section 35 which communicates with the slaves 22, 28, and 29. The slaves 22, 28, and 29 are each composed of a slave side communication section 23 which carries out the serial communication with the master 21 via the cable 30 or 31, a servo operation controller 24 which drives each servo motor 26, and a power source 25. The servo motor 26 has an encoder 27 for detecting its rotational position, and a detection signal is fed back to the controller 24.

In the above configuration, the master 21 issues operation commands for the motors 26 to the slaves 22, 28, and 29 at predetermined intervals, and the commands are transmitted to the slave side communication sections 23 of the slaves 22, 28, and 29 via the cables 30 and 31, respectively. The servo operation controller 24 and the power source 25 control the motor 26 based on the received commands from the master 21 in such a way as to satisfy the commands.

By the way, a recent electronic component mounting apparatus required to move at high speed and with high accuracy, for example, has the encoder 27 with high resolution for precisely detecting a position of the motor 26, so that a lot of command information has to be transmitted in the serial communication. Taking a case of the encoder 27 or a linear scale, for example, resolution thereof was previously 10,000 pulses per count, but recently it multiplies 10 to 100-fold, so that an amount of the transmitted command information accordingly increases. Also increase in the number of axes of the servo motor 26, according to extension of functions of the electronic component mounting apparatus, brings about accelerating increase in the number of sensors such as an origin point sensor and a limit sensor needed for drive axes, so that it becomes impossible to sufficiently transmit information because of lack of communication capacity in the conventional serial communication.

Since an amount of information transmitted in the serial communication increases with increase in the number of slaves connected to the master, if the number of the slaves increases in response to a demand of increase in the number of axes and the like, there is a problem in which an interval of transmission to each slave is increased and servo function of each slave is degraded.

Increase in an amount of transmitted information per unit time, that is, increase in transmission speed of the information can solve this problem. However, in this case the conventional motor drive device cannot be used because it is necessary to change all driver units to those of a high speed type. Also it is economically inadvisable to equally use the high speed type driver units as a driver unit of a relatively low speed motor, such as the motor for driving a conveyor section in which a substrate is transferred to a position to mount a component, and as a driver unit of a relatively high speed motor, such as the motor for driving a transfer head which sucks the component supplied by a component feeding section and moves over the substrate to mount the component.

Accordingly, as shown in FIG. 12, in a case where there are a plurality of communication formats having different transmission speed and data formats without compatibility (two communication formats are mixed as slaves A and B have a communication format A and a slave C has a communication format B), each of the plurality of communication formats A and B needs to have an individual serial communication section, so that there are problems in which a load of the master 21 becomes heavy and an amount of wiring increases.

In light of the foregoing problems, a main object of the present invention is to provide a motor drive device with high degree of compatibility which deals with a new communication format with a lot of information on a single serial bus in addition to enabling controlling of a conventional device.

DISCLOSURE OF THE INVENTION

A motor drive device according to the present invention having a plurality of driver units for driving a motor and a command generator for issuing a command to the driver units, which are connected in serial communication, is characterized by having a communication section which sets up unique communication formats corresponding to each of the driver units with different communication formats including data transmission speed from one another. According to the invention, it is possible to carry out communication between the plurality of driver units having the different data transmission speed and the like and the command generator on a single serial bus.

Since serial communication means on a command generator side has means for changing the communication format in real time, the motor drive device supports every driver unit with an old or new type of communication format.

Each driver unit certainly receives communication from the command generator, because a communication frame by the serial communication means on the command generator side is composed of a synchronous communication frame which is common to the plurality of driver units and is carried out at the beginning of the communication, and a normal communication frame following the synchronous communication.

In the synchronous communication frame the command generator transmits information about occupation time, in which each driver unit occupies communication, and in the normal communication frame each driver unit communicates with the command generator during only the occupation time of its own set up in the synchronous communication frame. When the same amount of information is transmitted, for example, a high-speed type and a low-speed type of driver units can transmit it in short time and in long time, respectively, and when the same occupation time are given thereto the high-speed type and the low-speed type of driver units can transmit a lot of and little information, respectively, so that it is possible to rationally make information transmission time shortest in total.

In a case where a measuring control device such as a sensor and the like is connected to a single serial bus in addition to the driver units of a servo motor and a pulse motor, it is possible to carry out multifunctional control.

The serial communication means composed of optical communication means using an optical cable realizes high speed communication with high degree of reliability.

BRIEF DESCRIPTION OF THE DRAWINGS

FIG. 5 is an explanatory view of contents of communication on the master side during a synchronous communication frame in the embodiment;

FIG. 6 is an explanatory view of contents of communication on the slave side during the synchronous communication frame in the embodiment;

BEST MODE FOR CARRYING OUT THE INVENTION

One embodiment of a motor drive device according to the present invention will be hereinafter described with reference to FIGS. 1 to 6.

Figure 1:
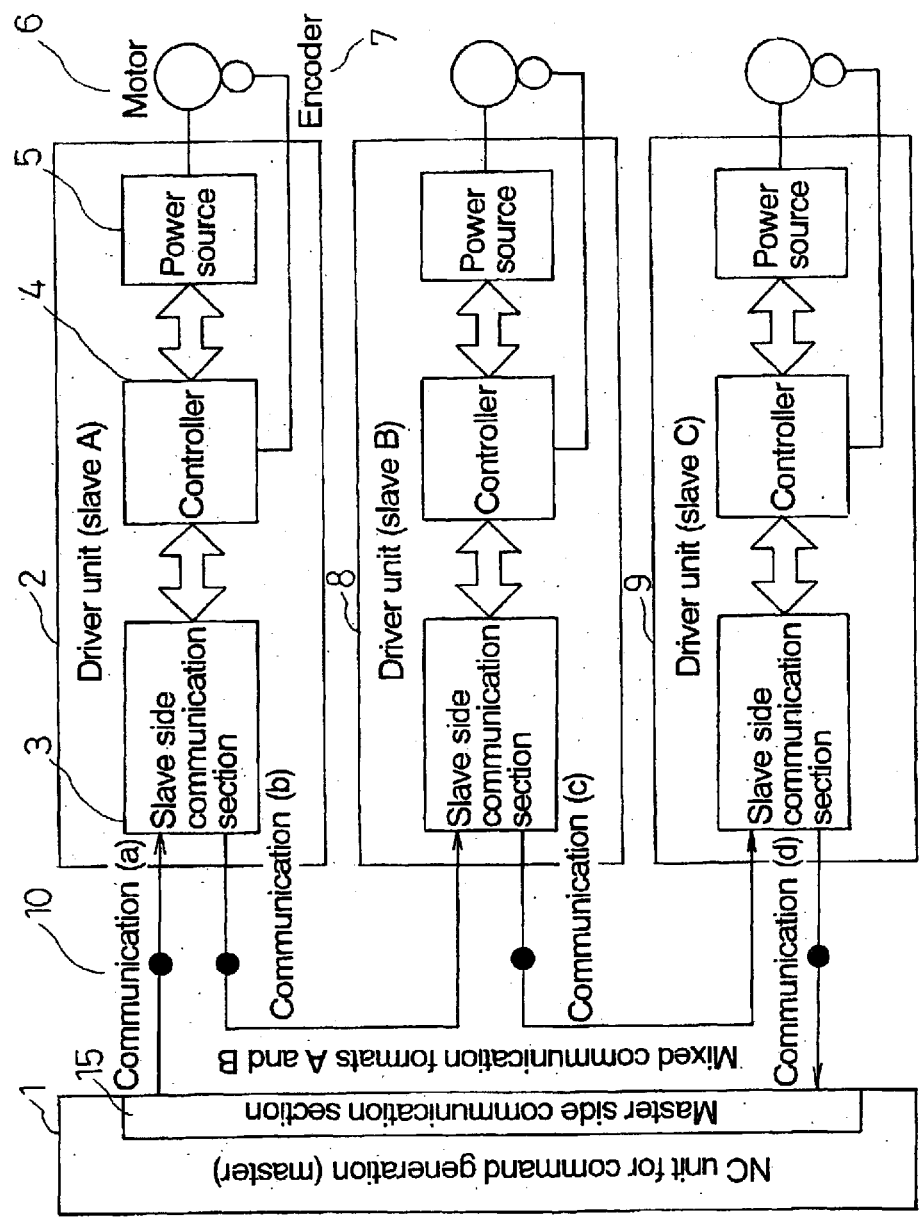
FIG. 1 is a diagram showing the schematic configuration of one embodiment of a motor drive device according to the present invention.

Referring to FIG. 1 which shows schematic configuration of a motor drive device according to the present embodiment, reference numeral 1 denotes an NC unit for command generation as a master unit (hereinafter called a master), reference numeral 15 denotes a master side communication section, reference numerals 2, 8, and 9 denote driver units, respectively (hereinafter called slaves A, B, and C). Each of the slaves A, B, and C includes a slave side communication section 3 for receiving serial communication information from the master 1, a servo operation controller 4 for driving each servo motor 6, and a power source 5 for driving the servo motor 6. The servo motor 6 is provided with an encoder 7 for detecting a rotational position thereof, and a detection signal therefrom is fed back to the servo operation controller 4. The master 1 and each of the slaves A, B, and C are connected by a single serial cable (a serial bus) 10.

Units having function concerned with communication such as the master side communication section 15, the slave side communication sections 3, the serial cable 10 and the like are collectively called a communication section.

Of the slaves A, B, and C, for example, the slaves A and C have an old communication format with low data transmission speed, and the slave B has a new communication format with high data transmission speed. The "communication format" described above is defined as a method and form to carry out communication which include the data transmission speed, a data format, an occupation time described later and the like.

In the present invention, even when there are a plurality of slaves with different communication formats from each other, the communication format of each slave is programmed into the communication section before a start of communication, so that the communication section realizes the communication in compliance with-each slave having a different communication format.

Process in the communication section will be hereinafter described in detail, but for the sake of making description brief, only the two slaves A and B shall be connected to the master 1 by the serial cable 10 composed of serial buses (a), (b), and (c).

Figure 2:
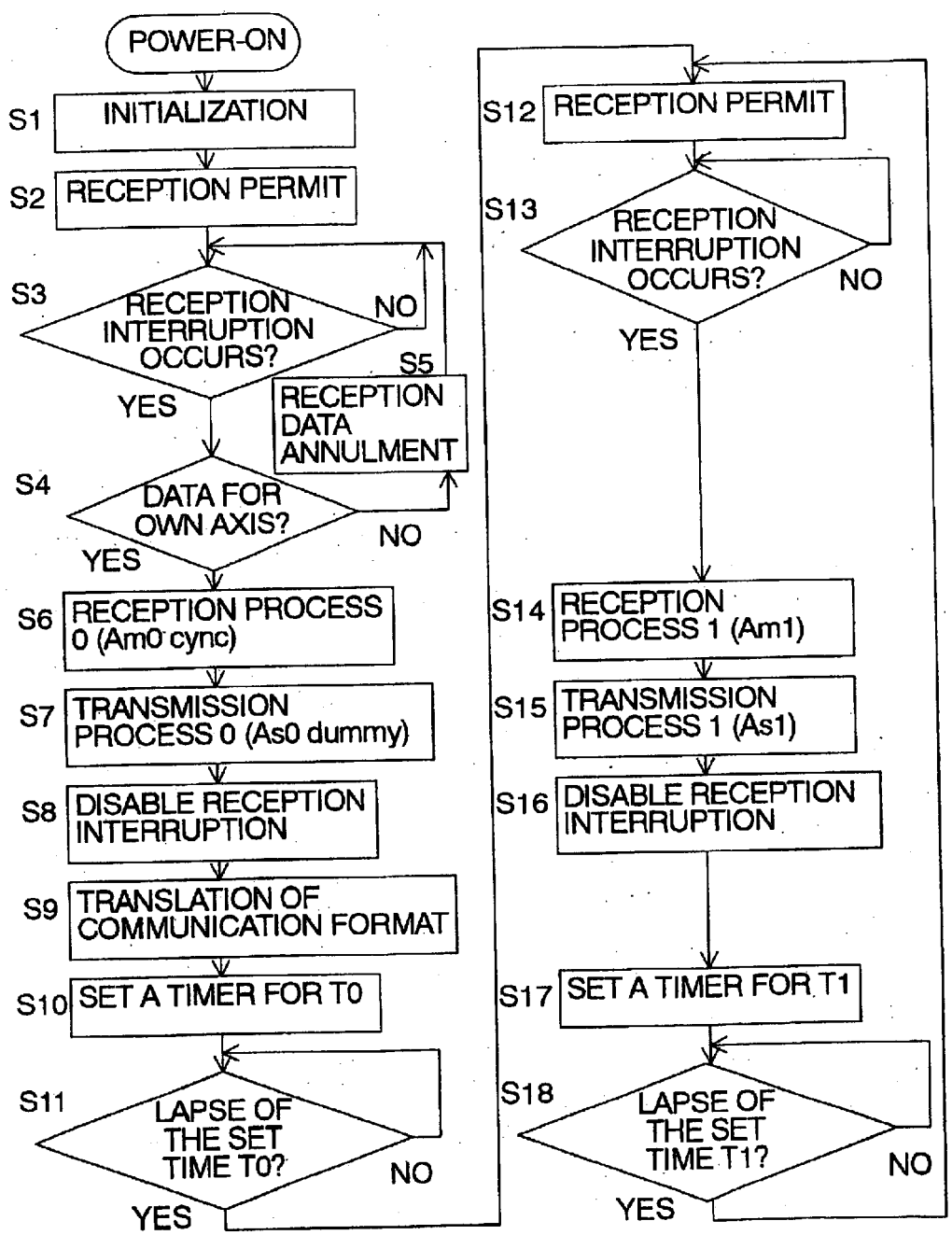
FIG. 2 is a flow chart of process on a slave side in the embodiment.
Figure 3:
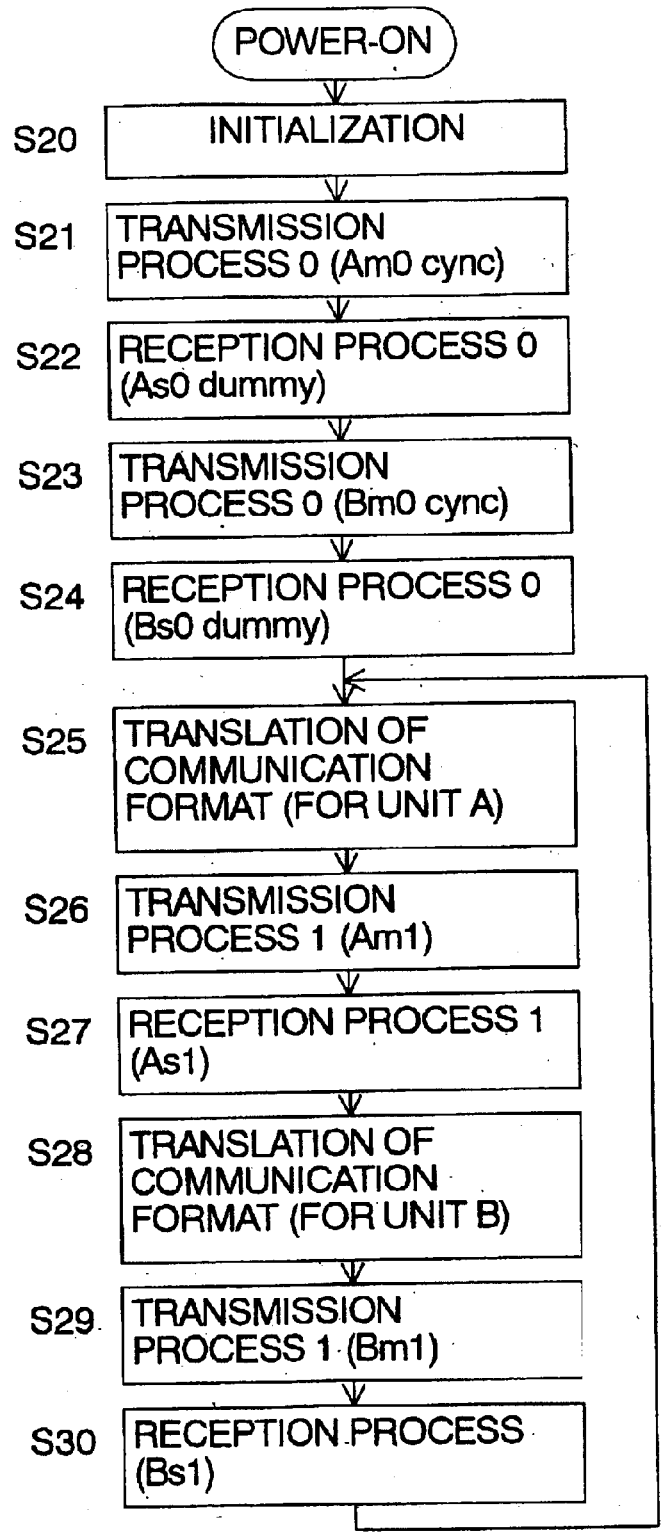
FIG. 3 is a flow chart of process on a master side in the embodiment.
Figure 4:
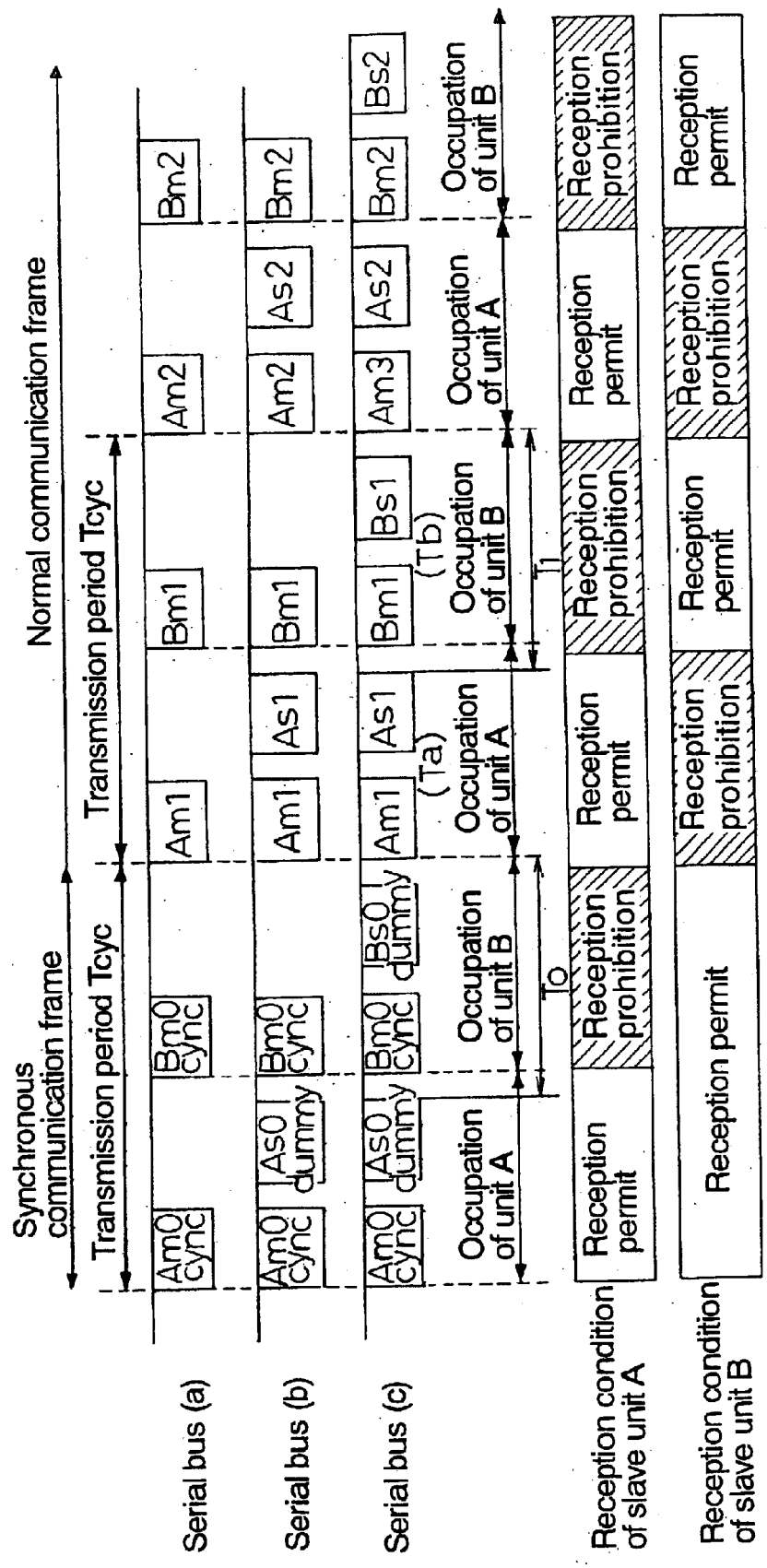
FIG. 4 is a timing chart of communication between the master and slaves in the embodiment.

Flows of process carried out in each unit of the communication section are described with referring to FIGS. 2 to 4. FIG. 2 is a flow chart of the process on a slave side, and FIG. 3 is a flow chart of the process on a master side, and FIG. 4 is a timing chart of communication among the master and each of the slaves A and B. Referring to FIG. 4, the communication among the units is composed of a synchronous communication frame and a normal communication frame. In the synchronous communication frame which is a communication stage carried out at the start of the communication, information to synchronize the units one another is exchanged. In other words, the information is exchanged in order to program the communication format in compliance with each slave. In the normal communication frame which is a communication stage carried out after the synchronous communication frame, fundamental information to operate each unit is exchanged. A common communication format, which every slave can translate, is used in the synchronous communication frame, and slave-specific communication formats programmed in the synchronous communication frame are used in the normal communication frame. Thus, each slave can receive only data in the common communication format and in the specific communication format of the slave own.

The synchronous communication frame and the normal communication frame are divided into each transmission period Tcyc. The transmission period, provided for the sake of synchronizing communication among the units, constitutes a unit of transmission, and a group of transmission and reception is carried out among the master and all slaves during the single transmission period. Each unit is synchronized with the transmission period, and various types of communication are carried out with repeating the transmission period.

In the synchronous communication frame, the slave, as shown in FIG. 2, is kept in a receivable condition (S2) after power-on and initialization (S1), and the master, as shown in FIG. 3, transmits information (S21 and S23) of the synchronous communication frame in the common communication format which every slave can translate, after initialization (S20). "Am0cync" and "Bm0cync", in FIG. 4 mean synchronized signals transmitted from the master to the slave A and slave B at the zero (initial) transmission period. Contents of the communication first transmitted after the power-on on the master side in the synchronous communication frame, as shown in FIG. 5, include the number of an axis indicating the corresponding slave (an axial number), the data format, the data transmission speed, the occupation time of the corresponding slave, additional communication data (dummy information is acceptable), an error code for restoring transmission error and the like. As shown in FIG. 6, contents of the communication on the slave side have the same format as FIG. 5.

Referring to FIG. 2, in a case where a reception interruption occurs on the slave side (S3), the slave interprets the axial number of the communication data from the master side (S4), and if the data is for the own axis (S4: Yes), the slave carries out a reception process (S6) (receives "Am0cync" and "Bm0cync", in FIG. 4) and a transmission process (S7) (transmits "As0dummy" and "Bs0dummy" in FIG. 4, where the "As0dummy" and "Bs0dummy" are dummy signals transmitted from the slaves A and B to the master at the zero transmission period). If the data is not for the own axis (S4: No), the slave annuls the reception data (S5) and waits again for data for the own axis in the receivable condition (S3). The master receives the signals "As0dummy" from the slave A and "Bs0dummy" from the slave B (S22 and S24).

After the transmission process (S7), the slave disables reception of the communication from the master until the next transmission period (S8). Until the next transmission period, the slave translates the communication format of the data format, the data transmission speed, the occupation time, an amount of the transmission data and the like to an own communication format (S9), and sets a timer for T0 corresponding to time from completion of the transmission process of S7 to a start of occupation of the own slave unit at the next transmission period (S10). After a lapse of the set time T0 (S11: Yes), the slave permits reception (S12) and shifts to the normal communication frame.

In this manner, communication between the master and each slave is set up with the communication format corresponding to each slave in the synchronous communication frame.

In the normal communication frame, the slave maintains the own communication format, and only carries out reception and transmission relating to the own axis without changing its communication format. When there is reception interruption during the occupation time of the own slave unit (S13: Yes), the slave carries out reception process (S14, Am1 and Bm1 in FIG. 4).

In the normal communication frame, it is unnecessary to judge whether the communication data is for the own axis or not, because the unit occupation times on the serial bus are defined in the synchronous communication frame. The slave carries out transmission process (FIG. 4: As1 and Bs1) in response to communication data from the master (FIG. 4: Am1 and Bm1) (S15), and then disables reception interruption again (S16), and sets a timer for T1 corresponding to time from completion of transmission process of S15 to a start of occupation of the own slave unit at the next transmission period (S17). After a lapse of the setting time T1 (S18: Yes), the slave prepares for reception in the next transmission period.

The occupation time of each slave (unit occupation time) described above is set up with allocating division of a single transmission period Tcyc to each slave in the normal communication frame. At that time, an amount of information and data transmission speed needed for each slave are taken into consideration. In a case where the slave A (unit A) and slave B (unit B) need an equal amount of information, for example, the slave A is a low speed type (an old type) and the slave B is a high speed type (a new type), so that "Ta" an occupation time of the slave A per each transmission period is set up longer than "Tb" that of the slave B per each transmission period. In this case, if the transmission period is repeated at N times during the normal communication frame, the occupation time of the slave A becomes N times Ta, and the occupation time of the slave B becomes N times Tb in total.

It is also possible to adopt a different allocation method of the occupation time of each slave from that described above. In a case where the slaves A and B are serially connected to the master as in the case described above, for example, the slave A may occupy the transmission periods at M times of N transmission periods, and the slave B may occupy the transmission periods at (N−M) times, by means of setting up the different setting time T1 from one slave to another, so that the occupation time of the slave A becomes M times Tcyc, and the occupation time of the slave B becomes (N−M) times Tcyc in total, when the transmission period is repeated at N times during the normal communication frame.

When many slaves are serially connected to the master, may be adopted the method in which each transmission period is divided into the occupation times of every slave at appropriate ratios, or a method in which the appropriate setting time T1 corresponding to each slave and an appropriate occupation ratio of own slave are set up in the occupied transmission period.

As described above, regulation of the occupation time of data flowing on the serial bus in each unit or slave makes it possible to communicate the data with a plurality of communication formats having the different data transmission speed and information on the single serial bus, because reception of the communication data with other formats is prevented.

The master, as shown in FIG. 3, transmits information of the synchronous communication frame ("Am0cync" and "Bm0cync" in FIG. 4) with the common communication format which every slave can translate (S21 and S23), and receives replies from the slaves ("As0dummy" and "Bs0dummy" in FIG. 4) (S22 and S24), and then ends the synchronous communication frame.

Then, the master translates data into the communication format of the slave A (S25), and communicates with the slave A (S26 and S27). After that, the master also translates data into the communication format of the slave B (S28), and communicates with the slave B (S29 and S30). The master repeats the process from S25 to S30 to communicate with the slaves.

In the above embodiment, a case with only two slaves, namely the slaves A and B, is described but the number of slaves is not limited thereto. 128 slaves, for example, can be connected to a single serial bus.

In the above embodiment, the communication format including the data transmission speed, the data format, the occupation time and the like is programmed by the transmission from the master side. However, it is possible that each slave transmits information about the communication format of its own to the master in order to set up the communication format.

An embodiment of an electronic component mounting apparatus which adopts the motor drive device according to the above embodiment will be hereinafter described.

Figure 7:
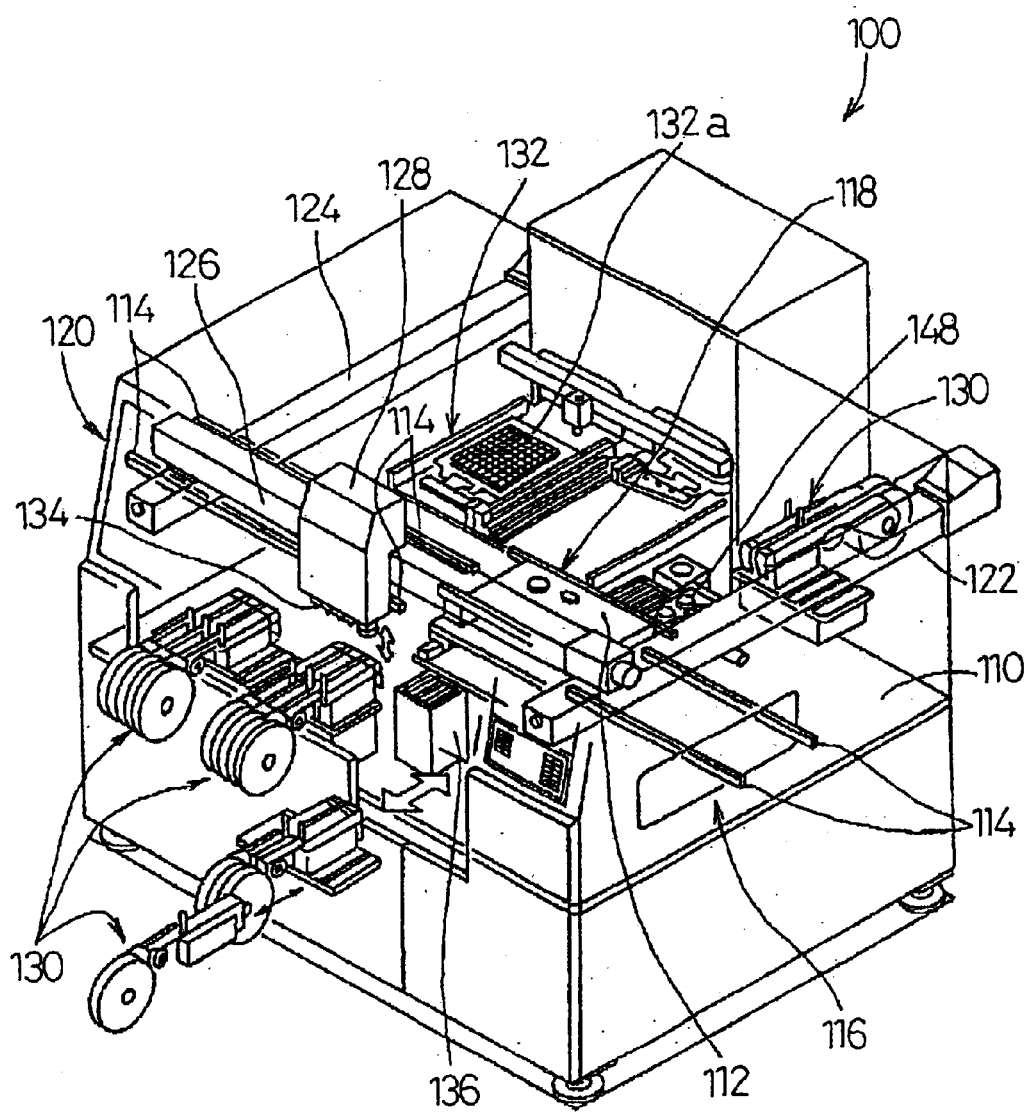
FIG. 7 is a perspective view of an electronic component mounting apparatus adopting the motor drive device according to the invention.
Figure 8:
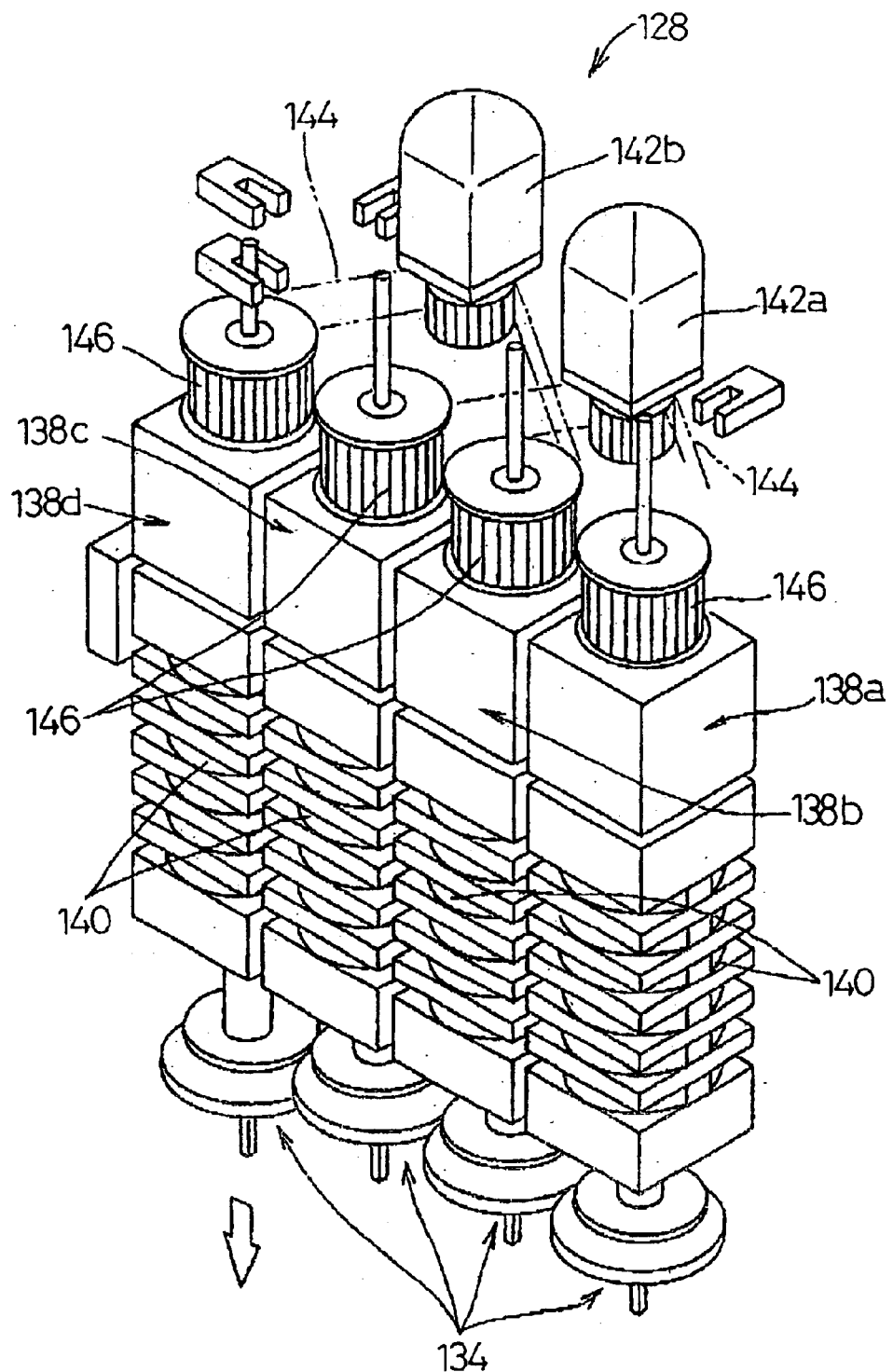
FIG. 8 is an enlarged perspective view of a transfer head of the electronic component mounting apparatus.
Figure 9:
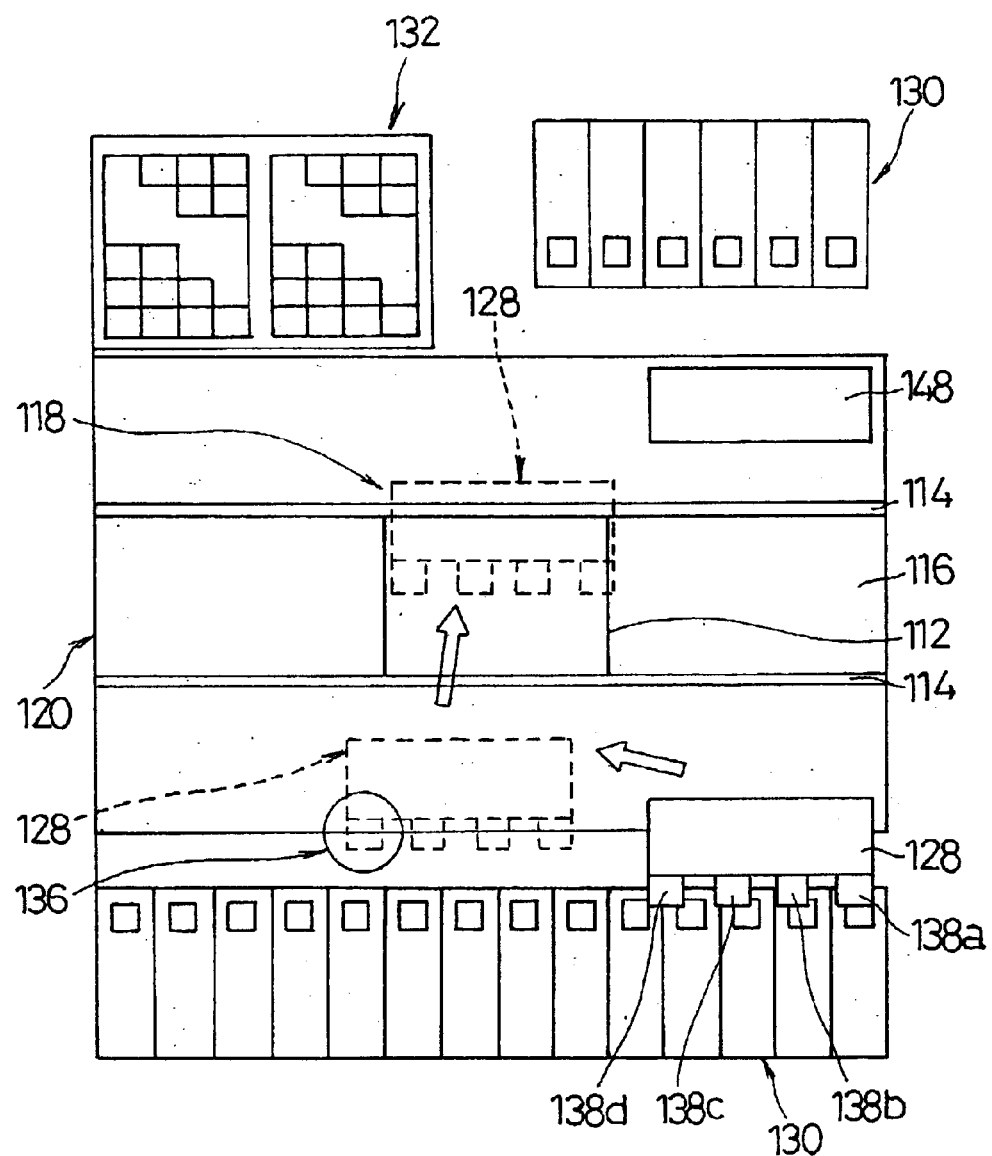
FIG. 9 is a schematic plan view of the electronic component mounting apparatus.

FIG. 7 is a perspective view of an electronic component mounting apparatus as an example of a mounting apparatus, and FIG. 8 is an enlarged perspective view of a transfer head of the electronic component mounting apparatus of FIG. 7, and FIG. 9 is a schematic plan view of the electronic component mounting apparatus. The configuration of an electronic component mounting apparatus 100 will be now described.

Referring to FIG. 7, a pair of guide rails 114 for conveying a substrate 112 is respectively provided in a loader section 116, a substrate holding section 118, and an un-loader section 120 (these three sections are collectively called a conveyor section.) which are in a middle of a top surface of a base stage 110 in the electronic component mounting apparatus 100. The substrate 112 is conveyed from the pair of guide rails 114 in the loader section 116 being one end side of the mounting apparatus to the pair of guide rails 114 in the substrate holding section 118 provided in a position to mount an electronic component, and from the pair of guide rails 114 in the substrate holding section 118 to the pair of guide rails 114 in the un-loader section 120 being the other end side of the apparatus, by means of synchronous drive of a carrier belt provided in each guide rail 114. The substrate holding section 118 prepares for mounting the component with fixing and holding a position of the conveyed substrate 112.

Y-axis robots 122 and 124 are provided on either side of the top surface of the base stage 110 above the substrate 112, and an X-axis robot 126 lies between the two Y-axis robots 122 and 124, so that the X-axis robot 126 is movable in a Y-axial direction with drive of the Y-axis robots 122 and 124. Since a transfer head 128 attached to the X-axis robot 126 is movable in an X-axial direction so as to go forward and backward, the transfer head 128 is movable in an X-Y plane. Each robot is composed of, for example, a ball screw forwardly and backwardly rotated by a motor, a nut member screwed into the ball screw and being movable in each axial direction, and a moving member fixed on the nut member.

The transfer head 128, which is mounted on an XY robot (an example of a transfer head convey device) composed of the X-axis robot 126 and the Y-axis robots 122 and 124 and is movable in the X-Y plane (a plane approximately in parallel with a horizontal plane or a top surface of the base stage 110), sucks a desired electronic component from a plurality of parts feeders 130 for feeding electronic components such as a resistor chip, a chip capacitor, and the like, or from a parts tray 132 for feeding relatively large sized electronic components such as an IC or connector packaged in an SOP (Small Outline Package), a QFP (Quad Flat Package) and the like with a suction nozzle 134a, and then mount it on a mounting position in the substrate 112. Mounting operation of the electronic component like this procedure is controlled by a controller (a master) 152 shown in FIG. 10 based on a preset mounting program stored in a memory section in advance.

Many parts feeders 130 are disposed on either side of the pair of guide rails 114 along their conveying direction (an upper right side and a lower left side of FIG. 7), and each parts feeder 130 has a tape-shaped component roll accommodating many electronic components such as resistor chips, chip capacitors and the like.

On the parts tray 132, two trays 132a can be disposed in total with a longitudinal direction of the trays 132a being in perpendicular to the substrate conveying direction of the guide rails 114. Each tray 132a slides to a guide rail 114 side in accordance with the number of supplied components, so that the trays 132a keep an extraction position of the components in Y direction. Many electronic components packaged in the QFP and the like are mounted on the trays 132a.

A displacement recognition device 136 provided on a side of the substrate 112, which is positioned by the pair of guide rails 114, detects two dimensional displacement (a sucked position) of the component sucked by the suction nozzle 134, and makes the displacement compensated by the transfer head 128.

Referring to FIG. 8, the transfer head 128, as an embodiment of the component holding device, is a multiple string head in which a plurality of (four in FIG. 8) mounting heads (a first mounting head 138a, a second mounting head 138b, a third mounting head 138c, and a forth mounting head 138d) are connect to each other side by side. The four mounting heads 138a, 138b, 138c, and 138d have the same structure, and each mounting head has the suction nozzle 134, an actuator 140 to move the suction nozzle 134 up and down, and a pulley 146. Since forward and backward rotational force of a motor 142a for theta rotation is transmitted to the pulleys 146 of the first mounting head 138a and the third mounting head 138c via a timing belt 144, both the suction nozzles 134 thereof simultaneously carry out the theta rotation (rotation about a shaft of the suction nozzle 134). Since forward and backward rotational force of a motor 142b for the theta rotation is transmitted to the pulleys 146 of the second mounting head 138b and the fourth mounting head 138d via the timing belt 144, both the suction nozzles 134 thereof simultaneously carry out the theta rotation. Each actuator 140 composed of an air cylinder, for example, moves the suction nozzle 134 up and down in response to switching of the air cylinder, in order to selectively hold and mount the component. In the transfer head 128, as shown in FIG. 8, the rotational force of the motor 142a for the theta rotation transmitted via the timing belt 144 makes the suction nozzles 134 of the mounting heads 138a and 138c carry out the theta rotation, and the rotational force of the motor 142b for the theta rotation transmitted via the timing belt 144 makes the suction nozzles of the mounting heads 138b and 138d carry out the theta rotation. However, the structure described above is just an embodiment, and each individual mounting head 138a to 138d can have a driving motor for the theta rotation. However, it is preferable to reduce the number of the driving motors for the theta rotation, in order to reduce weight of the transfer head 128.

The suction nozzle 134 of each mounting head is changeable, and spare suction nozzles to be changed are contained in advance in a nozzle storage 148 on the base stage 110 of the electronic component mounting apparatus 100. There are some types of suction nozzles 134 such as an S-size nozzle to suck a minute chip a size of which is approximately 1.0 mm×0.5 mm, an M-size nozzle to suck the QFP a size of which is 18 mm square and the like, and the nozzles are appropriately used in accordance with the type of an electronic component to be mounted.

Operation of the electronic component mounting apparatus with above structure will be hereinafter described.

Referring to FIG. 9, when the substrate 112 brought in from the loader section 116 of the pair of guide rails 114 is conveyed to the substrate holding section 118, the transfer head 128 moves in the X-Y plane with the XY robot to suck a desired electronic component from the parts feeder 130s or the parts tray 132. Then, the transfer head 128 moves over a position recognition camera of the recognition device 136 to recognize the sucked posture of the electronic component. The motor for the theta rotation is driven based on a result of recognition to carry out the theta rotation of the suction nozzles 134, thereby compensating the sucked posture thereof. Then, the electronic component is mounted on the component mounting position in the substrate 112.

When sucking the electronic component from the parts feeder 130 or the parts tray 132 by the suction nozzle 134, and when mounting it on the component mounting position in the substrate 112, each of the mounting heads 138a, 138b, 138c, and 138d moves down the suction nozzle 134 from the X-Y plane in a vertical direction (Z direction) by the operation of the actuator 140. The mounting heads 138a to 138d mount the electronic components while appropriately changing the suction nozzles 134 corresponding to the type of the electronic components.

The suction and mounting operations of the electronic components are repeated to complete the mounting of the electronic components on the substrate 112. The substrate 112 with the mounted components is conveyed from the substrate holding section 118 to the un-loader section 120, while a new substrate 112 is brought in from the loader section 116 to the substrate holding section 118 to repeat the above operations.

Here, mounting tact is divided in accordance with the mounting speed, such as high speed, middle speed, low speed and the like corresponding to the types (size and weight) of the electronic components. This is because of inertia of the electronic components, and the mounting speed is decided by sucking force of the suction nozzle 134 and force of contact between the electronic component and the substrate. While each absorption head attracts the component, the plurality of absorption heads can simultaneously attract the components. While each absorption head places the component, the plurality of absorption heads can simultaneously place the components.

Figure 10:
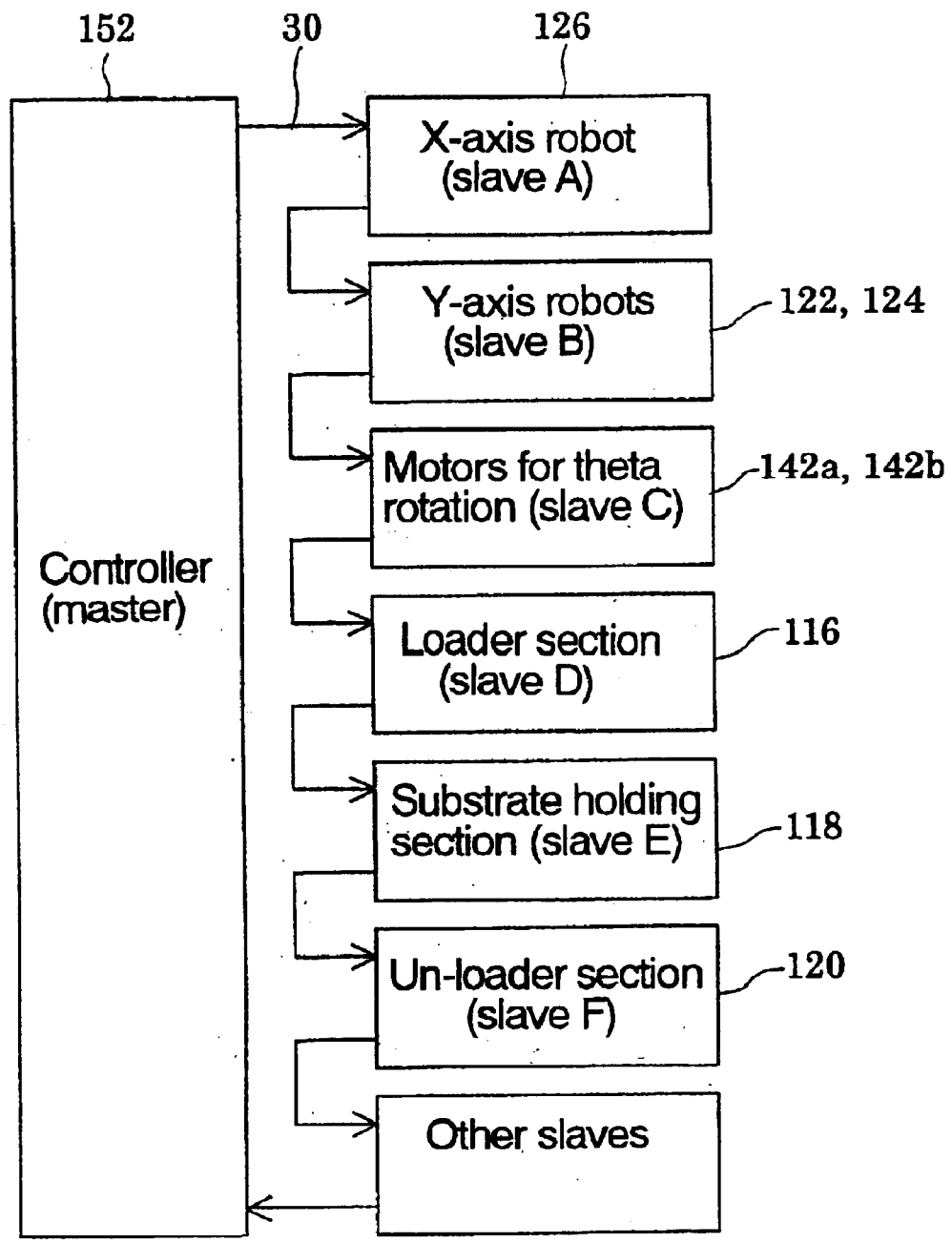
FIG. 10 is a block diagram showing steps of control in the electronic component mounting apparatus.

FIG. 10 is a block diagram showing steps of control in the electronic component mounting apparatus. As shown in FIG. 10, slaves A to F and other slaves are serially connected to a controller 152 which serves as a master. The slave A drives a motor for the X-axis robot 126. The slave B drives a motor for Y-axis robots 122 and 124. The slave C drives motors for theta rotation 142a and 142b. The slave D drives a motor of the loader section 116. The slave E drives a motor of the substrate holding section 118, and the slave F drives a motor of the un-loader section 120.

Since the X-axis robot 126, the Y-axis robots 122 and 124, and the motors for theta rotation 142a and 142b require positioning control with high speed and high accuracy, the slaves A to C need to take in a lot of information and to frequently transmit the information at shortened transmission intervals. On the other hand, the loader section 116, the substrate holding section 118, and the un-loader section 120 do not require the control with high speed and high accuracy, so the slaves D to F do not take in a lot of information and have long transmission intervals. In view of above, occupation times of the slaves A to F are set up in such a way as to be shown in FIG. 11, when the component mounting apparatus adopts the motor drive device of the present invention.

Figure 11:
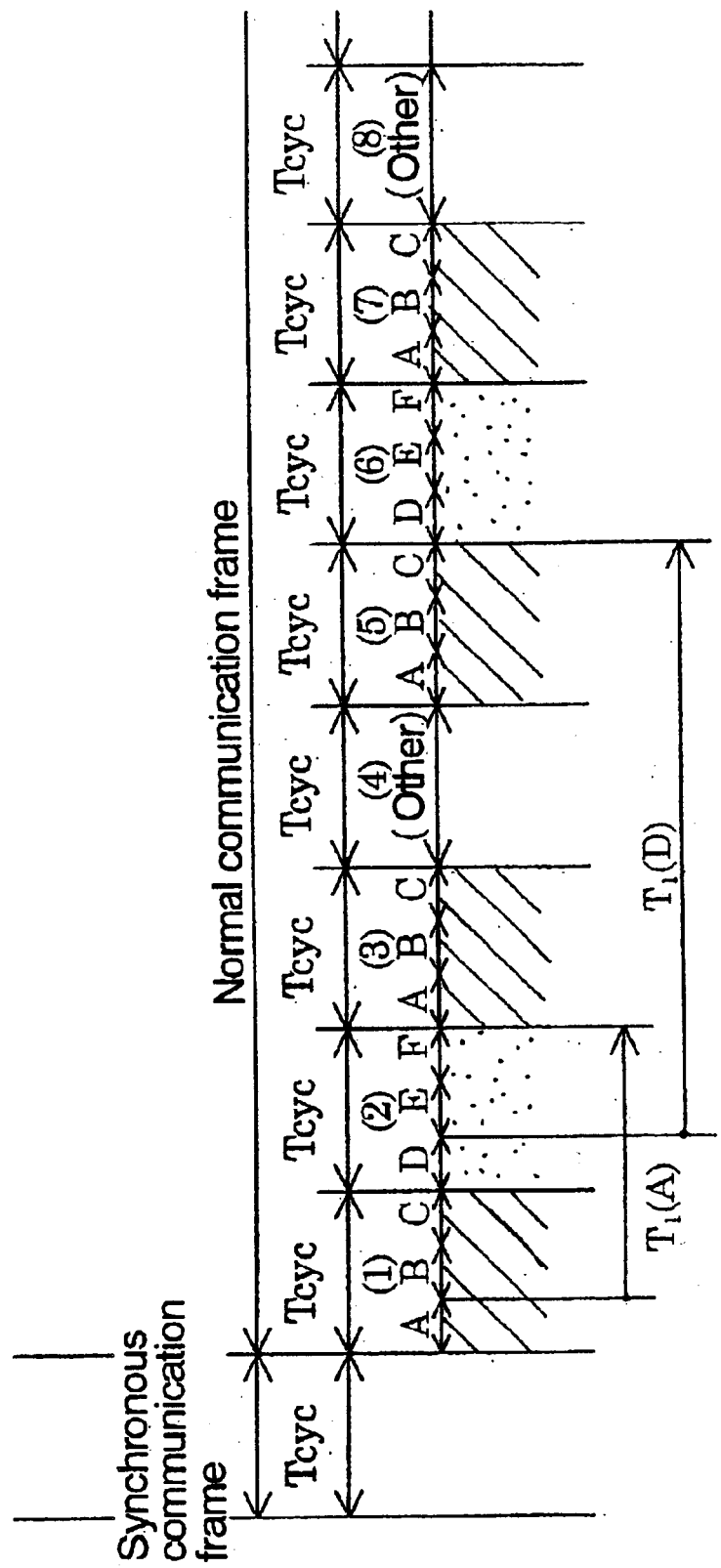
FIG. 11 is an explanatory view of occupation time of each slave during a transmission period in the electronic component mounting apparatus.
Figure 12:
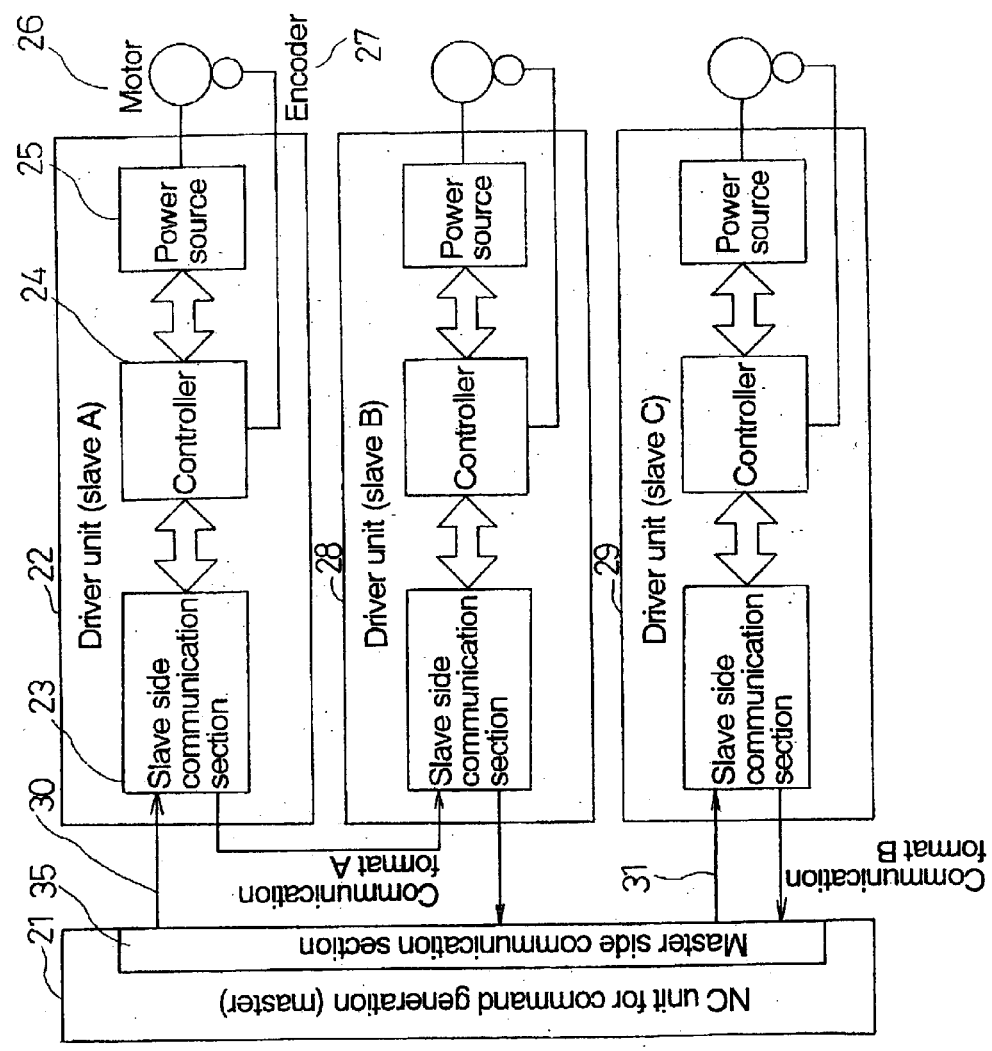
FIG. 12 is a diagram showing schematic configuration of a motor drive device used in a conventional electronic component mounting apparatus.

In FIG. 11, the occupation times of the slaves A to F are indicated with "A" to "F," respectively, in data transmission periods Tcyc, namely in a cycle of (1), (2), (3) . . . in the normal communication frame. The slaves A to C divide and occupy the first, third, fifth . . . data transmission periods, namely in a cycle of (1), (3), (5) . . . , and the slaves D to F divide and occupy the second, sixth . . . data transmission periods, namely in a cycle of (2), (6) . . . . Thus, $T_1$ (A) corresponding to the setting time $T_1$ of the slave A is about one-half of $T_1$ (D) corresponding to the setting time $T_1$ of the slave D. In this manner, the slaves A to C, which require high speed and high accuracy, have the long occupation times and the short communication intervals in comparison with the slaves D to F, which do not need high performance.

It is possible to treat an information transmission devices like a distortion sensor, an origin point sensor, and a limit sensor as the slave units, in addition to a driving shaft of a servo driver, a pulse motor, and the like. Accordingly it is possible to transmit whole information required for measurement control of the component mounting apparatus on a single serial bus, so that wiring is extensively reduced.

INDUSTRIAL APPLICABILITY

According to the present invention, since a motor drive device is equipped with serial communication means which supports driver units with different data transmission speed, it is possible to carry out communication in different communication formats on a single serial bus. Since both old and new types of driver units are adoptable in accordance with required speed and accuracy in control operation, the present invention is useful for realizing both increase in speed and accuracy of control and reduction in a burden of development.

What is claimed is:

1. A motor drive device comprising:
 a plurality of driver units for driving a motor;
 a command generator that transmits a command to the driver units, the command generator being connected to the driver units in serial communication; and
 a communication section that sets up unique communication formats corresponding to the driver units having different communication formats, including data transmission speed;
 wherein communication formats in the communication section are set during a synchronous communication frame comprising a communication stage in which the command generator and each of the driver units communicate using a communication format that is common to every driver unit, and after the synchronous communication frame, the command generator and each of the driver units transmit and receive information to control the motor during a normal communication frame comprising another communication stage in which communication formats corresponding to each of the driver units are used for communication; and
 wherein in the synchronous communication frame, the command generator transmits information including occupation times during which each of the driver units performs communication, and in the normal communication frame, each of the driver units communicates with the command generator during the occupation time of the driver unit, set up in the synchronous communication frame.

2. The motor drive device according to claim 1, wherein the command generator transmits information to set up the communication formats in the communication section.

3. The motor drive device according to claim 1, wherein the driver units transmit information corresponding to the respective communication formats of each of the driver units to set up the communication formats in the communication section.

4. The motor drive device according to claim 1, wherein the motor comprises at least one of a servo motor and a pulse motor.

5. The motor drive device according to claim 1, wherein serial communication is performed by optical communication using an optical cable.

6. The motor drive device according to claim 1, wherein during the synchronous communication frame, the command generator designates one of the driver units to be set up and transmits information to set up the communication format to the designated driver unit, and the driver unit receives the information when the driver unit is designated, and changes its communication format to the received communication format.

7. A method for driving a motor by a motor drive device, the motor drive device comprising a plurality of driver units for driving a motor, and a command generator that transmits a command to the driver units, the command generator being connected to the driver units in serial communication, the method comprising:

transmitting information from the command generator to the driver units with different communication formats including data transmission speed, during a synchronous communication frame comprising a communication stage in which a communication format, that is common to every driver unit, is used for communication to set up the communication formats corresponding to each of the driver units;

transmitting, during the synchronous communication frame, information including occupation times during which each of the driver units performs communication, the communication being performed during the normal communication frame between each of the driver units with the command generator during the occupation time of the driver unit which is set up in the synchronous communication frame;

transmitting and receiving, after the synchronous communication frame, information to control the motor during a normal communication frame comprising another communication stage in which communication formats corresponding to each of the driver units are used for communication; and communicating information to control the motor during a normal communication frame comprising a communication stage in which the communication formats corresponding to each of the driver units are used for communication.

8. A component mounting apparatus including a conveyor section for conveying a substrate to a position where a component is mounted, and a transfer head mounted on an XY robot including an X-axis robot and a Y-axis robot in such a manner as to be movable on an X-Y plane, the transfer head sucking the component supplied by a component feeding section and moving over the substrate to mount the component, the component mounting apparatus comprising:

driver units that drive each motor of the conveyor section, the X-axis robot, and the Y-axis robot;

a command generator that transmits a command to the driver units, the command generator being connected to each of the driver units in serial communication; and a communication section that sets up unique communication formats corresponding to each of the driver units having different communication formats including data transmission speed.

9. The component mounting apparatus according to claim 8, wherein the communication formats in the communication section are set by transmitting information to set up the communication format from the command generator during a synchronous communication frame comprising a communication stage in which a communication format for every driver unit is used for communication between the command generator and each of the driver units, and after the synchronous communication frame, the communication generator and each of the driver units transmit and receive information to control the motor during a normal communication frame comprising another communication stage in which communication formats corresponding to each of the driver units are used for communication.

10. The component mounting apparatus according to claim 9, wherein in the synchronous communication frame, the command generator transmits information including occupation times during which each of the driver units performs communication, and in the normal communication frame, each of the driver units communicates with the command generator during the occupation time of the driver unit, set up in the synchronous communication frame.

11. The component mounting apparatus according to claim 10, wherein the occupation times are periodically provided in the normal communication frame by periodically dividing the normal communication frame, and an occupation time interval of the driver units that drive the motor of the conveyor section is set to be longer than an occupation interval time of the driver units that drive the motors of the X-axis robot and the Y-axis robot.

* * * * *